ECHO SUPPRESSOR FOR LONG-DISTANCE COMMUNICATION NETWORK

Filed Sept. 8, 1965 2 Sheets-Sheet 1

INVENTORS
AKIRA MIURA
KUNIICHI NAGATA
BY
OSTROLENK, FABER, GERB & SOFFEN
ATTORNEYS

ECHO SUPPRESSOR FOR LONG-DISTANCE COMMUNICATION NETWORK

Filed Sept. 8, 1965 2 Sheets-Sheet 2

INVENTORS
AKIRA MIURA
BY KUNIICHI NAGATA
OSTROLENK, FABER, GERB & SOFFEN
ATTORNEYS

United States Patent Office 3,465,106
Patented Sept. 2, 1969

3,465,106

ECHO SUPPRESSOR FOR LONG-DISTANCE COMMUNICATION NETWORK

Kuniichi Nagata and Akira Miura, Tokyo, Japan, assignors to Nippon Electric Company Limited, Tokyo, Japan Filed Sept. 8, 1965, Ser. No. 485,886
Claims priority, application Japan, Sept. 10, 1964, 39/51,649
Int. Cl. H04b 3/22; H04m 9/08
U.S. Cl. 179—170.2 15 Claims

ABSTRACT OF THE DISCLOSURE

An echo suppressor for eliminating the phenomenon referred to as "talker's echo" normally encountered in long-distance communication networks. The suppressor is especially useful in networks comprising a four-wire circuit having an incoming and an outgoing path, which paths are coupled to a two-wire circuit by means of a hybrid circuit. The echo suppressor applies an impulse to the incoming path responsive to the indication of an established connection between calling and called parties and prior to the occurrence of the actual message. The leakage component of the impulse passed from the input path to the output path by way of the hybrid circuit is converted into its binary equivalent and stored. As soon as the message begins, the instantaneous signals of the message are converted into a binary equivalent and applied to a buffer storage circuit. The binary signals in the memory and buffer storage circuits are converted into analog signals, the product of these analog signals is formed, and the resulting product signal is integrated and phase-inverted so as to be subtractively combined with the leakage component appearing in the output path resulting from the calling subscriber signals so as to substantially cancel and thereby eliminate "talker's echo."

The instant invention relates to an echo suppressor for use in long-distance communication networks which may utilize a telecommunication satellite or submarine cables, and more particularly, to an echo suppressor for suppressing the so-called "talker's echo" at each terminal equipment of the network, which echo is caused at the four-wire terminating set of the terminal equipment by impedance unbalance between the long-distance network of the four-wire system and the local toll circuit of the two-wire system.

Long-distance communication networks are typically comprised of a four-wire circuit wherein the carriers or subcarriers are respectively allotted to outgoing and incoming information signals. A local toll circuit normally connects the four-wire circuit, through terminal equipment, to a calling or called subscriber set which is comprised of the two-wire circuit. A four-wire terminating set (or four-wire to two-wire conversion device) must therefore be provided at the terminal equipment to suitably connect the two-wire and four-wire circuits. The conventional four-wire terminating set is comprised of a hybrid coil and an impedance balancing network for attaining impedance balance between the two and four-wire circuits. However, inasmuch as the impedance of the two-wire circuit varies by an appreciable amount as a function of the distance between the terminal equipment and the local subscriber set at the extremity of the two-wire circuit or according to the performance of telephone exchanges and transmission lines between the terminal equipment and the subscriber set, it can not be expected, as a practical matter, to attain impedance balance for any arbitrary subscriber sets.

For the convenience of explanation, it is assumed hereinafter that a calling subscriber at the remote end of the long-distance communication network calls a local subscriber on this side of the network. In the case where the above-mentioned impedance balance is attained, the information signal of the calling (remote) subscriber supplied through the communication network to the four-wire input terminal pair of the above-mentioned hybrid coil passes without any ill effect through the hybrid coil and the two-wire circuit to the called (local) subscriber set. In the case where the impedance is not completely balanced, the information signal leaks through the hybrid coil to appear at the output terminal pair of the four-wire circuit thereof, and then is sent back to the calling subscriber, causing the phenomenon commonly referred to as "talker's echo." Although the talker's echo produced in a comparatively short distance network does not cause much disturbance in the conversation, the echo produced in a long-distance communication network appreciably affects the quality and performance of the conversation, because the speech of the calling subscriber returns to the person speaking as the talker's echo after a transmission period of the order of several hundred milliseconds.

An echo suppressor which is conventionally used for suppressing or removing the talker's echo has a structure which is designed to compare the outgoing signal level at the four-wire output terminal pair of the hybrid coil with the incoming signal level, in order to control the outgoing signal circuit to be selectively disconnected to interrupt the outgoing signal when the result of comparison shows that the outgoing signal level is not higher than the incoming signal level. Therefore, the success of a conventional echo suppressor of the type described is based on the assumption that the leakage component of the calling subscriber's information signal appearing at the four-wire output terminal pair is at a lower level than the level of the information signal at the input terminal pair, and that the level of the calling subscriber's information signal, transmitted from the remote end of the long-distance network is not higher than that of the called subscriber's information signal, when viewed at the hybrid coil of the terminal equipment. However, in case the level of the calling subscriber's information signal exceeds that of the called subscriber's, due to the caller's loud voice or for any other reason, the outgoing signal circuit is disconnected even if the called subscriber's information signal is expected to be transmitted, with the result that the latter signal (called subscriber's signal) is intermittently transmitted and that a malfunction (commonly referred to as mutilation of conversation) is caused in the performance of the communication system. In order to prevent such malfunction, the called subscriber should speak more loudly so that his information signal level may exceed, at the terminal equipment, the level of the calling subscriber's information signal. Problems of this kind are discussed in a paper entitled "Subscriber's Tolerance of Echo—A Report of Recent Tests Involving User Reaction to Echo and Delay on Telephone Transmission Circuits" disclosed under the title "Question 6/XII," in Temporary Document No. 2-E of C.C.I. T.T., Study Group XII (Geneva 9–12, June 1964), and so will not be detailed any further.

It is therefore an object of this invention to provide an echo suppressor which makes it possible to suppress or remove the talker's echo without being affected by the above-mentioned malfunction in the performance of the communication system.

The echo suppressor of the present invention has a structure which, instead of comparing the level of the incoming and outgoing signals at the terminal equipment operates to cancel the leakage (echo) component of the calling subscriber's signal by inversely adding thereto a synthesized signal which is produced, independently of the leakage component, by causing the incoming calling subscriber's signal to pass through a synthesizing circuit having a transfer function substantially equal to the circuit for the leakage component. More particularly, the device of the instant invention comprises: means for generating a search pulse within a short time period between the completion of the communication channel and initiation of the conversation and passing the search pulse through the same circuit as the leakage component so as to determine, from the waveform of the resulting output pulse, the transfer function or impulse response characteristic of the circuit; means for storing the impulse response characteristic thus obtained in digital form until at least the communication service is completed; means for converting the calling subscriber's signal into a digital signal and for buffer-storing the same; multiplier means for producing the product of the stored impulse response characteristic and the buffer-stored signal; an integrator circuit for time-integrating the signal representing the product; and means for inversely adding the integrated signal, which is a close approximation to the leakage component, to the latter (leakage) component, to thereby substantially cancel the leakage component. This invention is based on the fact that an output signal $g(t)$ from a certain circuit is, in general, expressed as follows by the time-integral of the product of the input signal $f(t)$ and the impulse response characteristic $k(t)$ of the circuit:

$$g(t)=\int_0^\infty f(t-\tau)k(\tau)d\tau$$

and that the expression is closely approximated by $$g(t)=\sum_{i=1}^{N} f(t-\tau_i)k(\tau_i)\Delta\tau$$

where N is an arbitrary natural number.

One primary object of the instant invention is to provide a novel echo suppressor for use in long distance networks.

Another object of the instant invention is to provide a novel electronic device for suppressing the talker's echo in a long-distance communication network, coupling a two-wire circuit at the end terminals of a four-wire circuit.

Another object of the instant invention is to provide a novel electronic device for suppressing the talker's echo in a long-distance communication network, coupling a two-wire circuit at the end terminals of a four-wire circuit wherein means are provided for generating an impulse response characteristic representative of the transfer function of the terminal circuit, means for multiplying this impulse response characteristic to the calling subscriber signal, means for integrating the resulting product and means for subtracting this product from the leakage component so as to cancel the leakage component.

Still another object of the instant invention is to provide a novel electronic device for suppressing the talker's echo in a long-distance communication network, coupling a two-wire circuit at the end terminals of a four-wire circuit wherein means are provided for generating an impulse response characteristic representative of the transfer function of the terminal circuit, means for multiplying this impulse response characteristic to the calling subscriber signal, means for integrating the resulting product and means for subtracting this product from the leakage component so as to cancel the leakage component and wherein the impulse response characteristic and the calling subscriber signal are converted into digital form and stored in suitable storage means so as to be available at a later time for conversion back into analog form to produce the above mentioned resulting product which acts to cancel the leakage component.

These and other objects of the instant invention will become apparent when reading the accompanying description and drawings in which.

Figure 1:
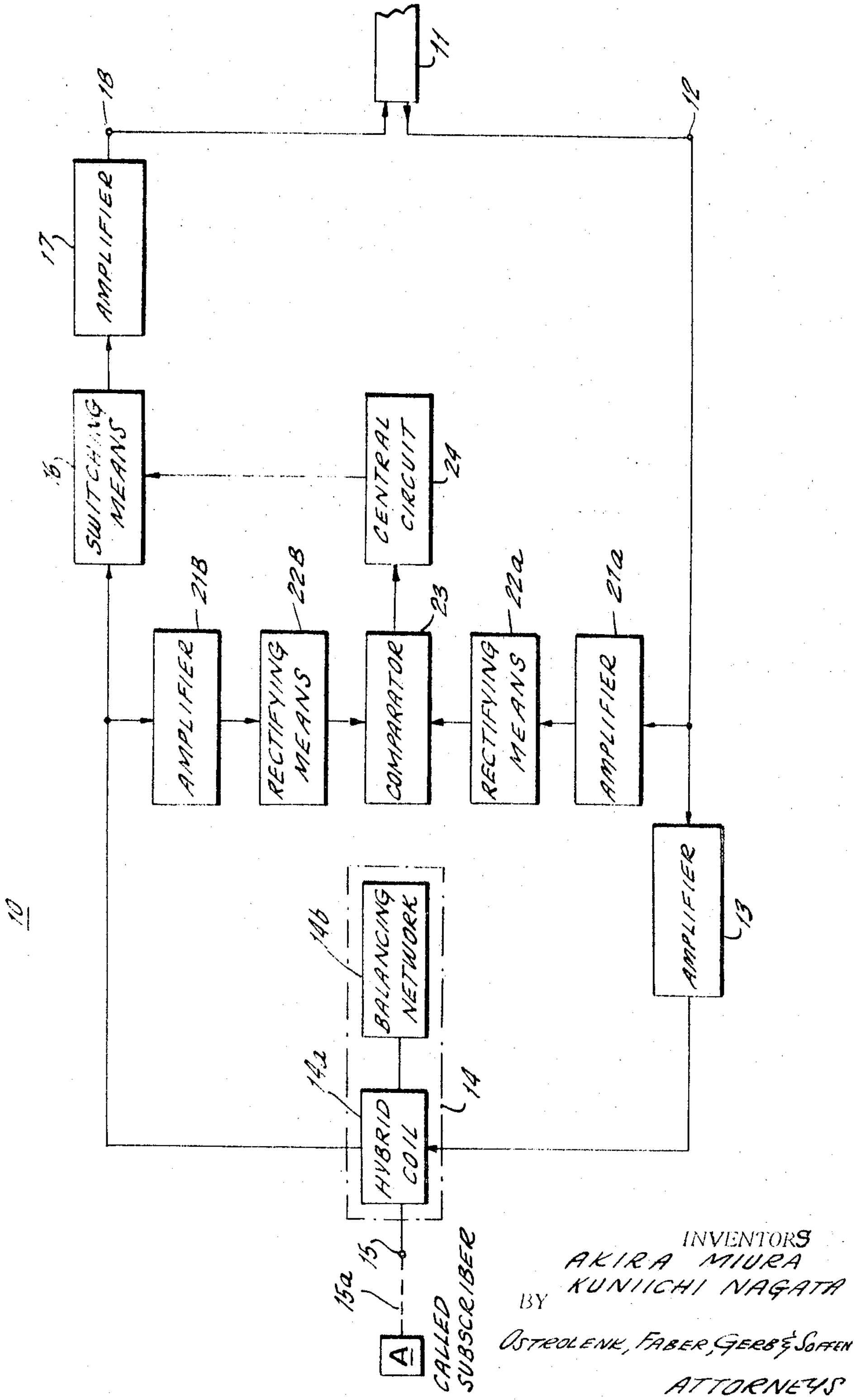
FIG. 1 PRIOR ART
FIGURE 1 is a block diagram of a conventional echo suppressor.

In the conventional echo suppressor 10 shown in FIGURE 1, the calling subscriber's signal is transmitted through means such as a long-distance communication network 11 which may utilize a communication satellite or submarine cables, and is supplied to an input terminal 12 after being demodulated by suitable demodulator means forming part of the terminal equipment (not shown). The demodulated signal is then amplified by an input amplifier 13, led through a four-wire line terminating set 14, to a two-wire line terminal 15, and then sent to a called subscriber set A through transmission lines and telephone exchanges designated by the dotted line 15*a*.

In the reverse direction the called subscriber's replying signal (i.e. voice message) is transmitted to the calling subscriber through the lines and exchanges 15*a*, terminal 15, the terminating set 14, a switching means 16 which is in the normally closed state, an output amplifier 17, an output terminal 18, and the long-distance network 11. It should be understood that the long-distance network 11 will be terminated at its remote end (not shown) to an arrangement substantially identical in configuration and function to the arrangement 10 shown in FIGURE 1.

One of the plural coils (not shown) of a hybrid coil 14*a* constituting the terminating set 14 is connected, as is well known to those with ordinary skill in the art, to a balancing network 14*b* whose impedance is approximately equal to that of two-wire line seen from the terminal 15, with a view to ensuring the impedance-balanced state (or direction-determining property) of the terminating set 14. One typical hybrid circuit arrangement is set forth in the Publication "Elements of Electricity and Magnetism as Applied to Telephone and Telegraph Circuits," published by the Long Lines Division of the American Telephone and Telegraph Company. A detailed description of such hybrid coils will therefore be omitted as they are well known to the art and such a detailed description is set forth in the above mentioned publication. However, the impedance of the two-wire line at the terminal 14 varies appreciably according to the variation in the distance of the two-wire line extending to the called subscriber A, or to the performance of telephone exchanges disposed between the terminal equipment and the subscriber set. The terminating set 14 is therefore liable to be affected in its direction-determining property by the impedance unbalance, with the result that a portion of the incoming calling subscriber's signal appears on the output terminal pair (on the side of the switching means 16) of the terminating set 14, which is included in the transmission route for the called subscriber's signal, and thereby sent back to the calling subscriber through the switching means 16, amplifier 17, the terminal 18 and the network 11.

To prevent this talker's echo the conventional device, therefore, comprises amplifiers 21A and 21B, respectively, connected to the input terminal 12 and the junction between the terminating set 14 and the switching means 16; rectifiers 22A and 22B, respectively, connected to the amplifiers 21A and 21B so as to produce output signals representative of the average signal levels at the amplifiers; a comparator 23 for comparing the level of the output signals from the rectifiers 22A and 22B, and a control circuit 24 connected to the switching means 16 for driving the same in response to the output signal from the comparator 23. The amplification degrees of the amplifiers 21A and 21B are fixed at such values that the comparator 23 may produce the comparison output to drive the control circuit 24 so as to open the normally closed switching circuit 16 and thereby to interrupt the outgoing signal, when the level of the signal component appearing at the input side of the amplifier 21A exceeds that of the signal component at the input side of the amplifier 21B. Therefore, if the called subscriber's signal level (monitored at the input side of the amplifier 21B) becomes relatively lower than the calling subscriber's (at the input side of the amplifier 21A), due, possibly, to the loud voice of the calling subscriber or for any other reasons, the called subscriber's signal to be transmitted through the output terminal 18 is interrupted by the switching means 16 together with the leakage component, with the result that the above-mentioned malfunction in the performance can not be prevented. The control circuit 24 may, for example, be a suitable relay means which when deenergized allows the switching means to remain closed when the average signal output of rectifying means **22*b* is greater than the average output signal of rectifying means 22*a*. In the case where the output of rectifying means 22*a* is greater than the output of rectifying means 22*b* to indicate that the calling subscriber signal is being received, the control circuit which is comprised of a relay will operate to open switching means 16**.

Figure 2:
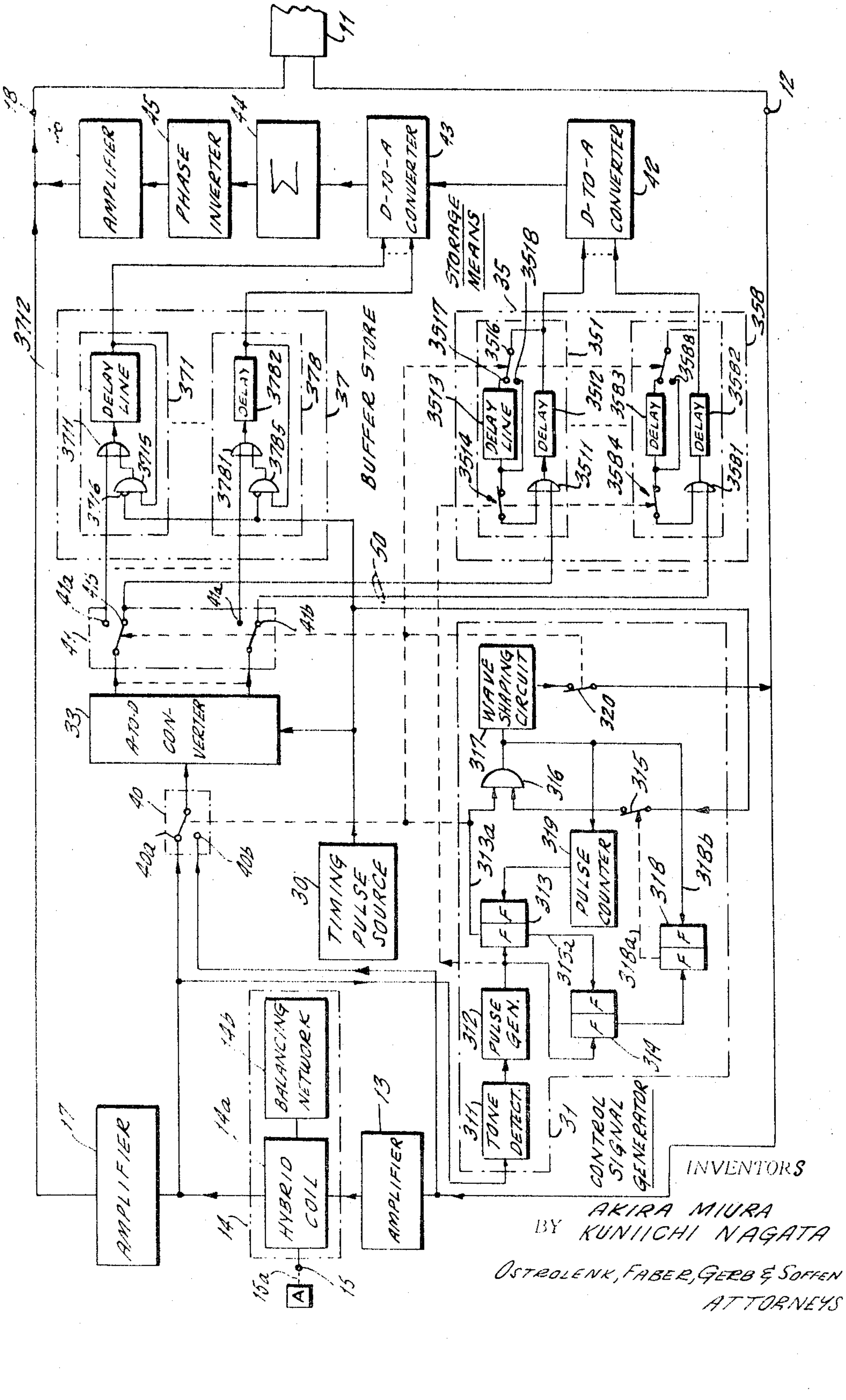
FIGURE 2 shows a schematic diagram in blocks of an embodiment of the invention. It should be noted that like elements in the figures are designated with like numerals.

Referring to FIGURE 2, the echo suppressor of the invention shown therein comprises: (in addition to the input and output terminals 12 and 18 connected to the long-distance communication network 11) the input amplifier 13 for amplifying the received calling subscriber's signal, the four-wire line terminating set 14, the two-wire line terminal 15, and the output amplifier 17 for amplifying the called subscriber's signal, all of which are included also in the conventional device of FIGURE 1; a timing pulse source 30 for producing timing pulses having a repetition period of 125 microseconds (8 kilocycles in frequency), a control signal generator 31 connected to the output side terminal pair of the terminating set 14 for generating two control signals (to be described subsequently) in response to the timing pulses and the signal at the last-mentioned terminal pair, an analog-to-digital converter 33 for converting either the output analog signal (the impulse response characteristic to be mentioned later) from the terminating set 14 or the calling subscriber's signal from the input terminal 12 into a parallel 8-digit binary signal group with sampling frequency equal to the timing pulses, a storage device 35 for storing the impulse response characteristic in digital form, a buffer store 37 for temporarily storing the calling subscriber's signal, switching means 40 and 41, respectively, disposed on the input and output sides of the A-to-D converter 33 for enabling the converter 33 to be used in common to the impulse response characteristics and the calling subscriber's signal, a first digital-to-analog converter 42 for converting the digital signal memorized in the store 35 back to an analog form of the impulse response characteristic, a second digital-to-analog converter 43 for converting the digital signal from the buffer store 37 into the analog signal using as the reference potential thereof the output analog signal from the first D-to-A converter 42, an integrator circuit 44 for time-integrating the waveform of the output analog signal of the second D-to-A converter 43, a phase inverter 45, and an amplifier 46 for coupling composite signal to the outgoing line where it is inversely added to the leakage component.

The control signal generator 31 is comprised of: a detector 311 for detecting, by way of analysis in time and frequency domains the ring-back tone supplied from the two-wire line upon completion of the called subscriber circuit, and for producing a trigger pulse within the short period from the termination of the ring-back tone to the beginning of the conversation; a first pulse generator 312 for producing a first control pulse upon reception of the trigger pulse; a first flip-flop circuit 313 for producing a second control pulse upon reception of the first control pulse; a second flip-flop circuit 314 adapted to be supplied with the first and second control pulses; an AND gate 316 for admitting the timing pulses supplied through a switch 315 to pass therethrough only when the second control pulse is present; a waveform shaping circuit 317 for shaping the output of the AND gate 316 so as to supply the gated output as the search pulse to the amplifier 13 through a switch 320 (to be described subsequently); a third flip-flop circuit 318 supplied with the outputs of the second flip-flop circuit 314 and the AND gate 316 for producing an ON-OFF controlling pulse for the switch 315; and a pulse counter 319, responsive to the output of the AND gate 316, for counting down the timing pulses at the rate of 125 to 1 and for feeding back the counted down pulse to the first flip-flop circuit 313 so as to reset flip-flop 313.

The A-to-D converter 33 may be any usual converter of the kind well known in this technical field (for example, "Notes on Analogue-Digital Conversion" edited by A. K. Susskind and published jointly by The Technology Press of MIT and John Wiley and Sons, Inc., New York (1957) incorporated herein by reference thereto) which is capable of converting the input analog signal into a parallel 8-digit binary signal at the sampling frequency of 8 kc. equal to that of the timing pulses.

The storage means 35 comprises eight delay line store elements 351 to 358 (only two of which are shown for purposes of simplicity) corresponding to the eight digits of the binary signal from the A-to-D converter 33. Among the elements 351 to 358, the element 351 comprises an OR gate 3511, a delay line 3512 having the delay time of 125 microseconds, another delay line 3513 having the delay time of 1 microsecond, a storage resetting switch 3514 for disconnecting the store loop upon reception of the first control pulse from the control pulse generator 31, a store loop selection switch 3516 for changing the loop store time of 126 microseconds to 125 microseconds by excluding the delay line 3513 of 1 microsecond upon reception of the second control pulse. Other store elements 352 to 358 have respective structural components corresponding to those in the element 351, and so will not be described further (in the drawings, like reference numerals designate similar elements as was previously mentioned). In any one of these delay line store elements 351 to 358, a bit of the incoming binary signal will be circulated with the period of 126 microseconds, so long as the store loop selection switches **35*n*6** (*n* may be any number from 1 to 8, and the same shall apply to the following description) connects the delay line **35*n*2 in series with the delay line 35*n*3 and simultaneously as the resetting switch 35*n*4 is closed. The output binary signal from those store elements 351 to 358 is applied to the first D-to-A converter 42. The converter 42** is composed of, as is well known, a reference potential source of constant voltage, and a weighting resistor having resistance or conductance varying in accordance with the digital value of the binary signal. A detailed description of such D-to-A converters may be found in the above mentioned publictaion by Susskind and will be omitted for the sake of brevity.

Similarly, the buffer store 37 comprises eight delay line store elements 371 to 378. Among these store elements, the element 371 comprises an OR gate 3711, a delay line 3712 having the delay time of 124 microseconds, and an inhibitor circuit 3715 responsive to the timing pulses supplied thereto from timing pulse source 30 as the inhibition input for feeding back a portion of the output of the delay line 3712 to its input side. Other store elements 372 to 378 have similar structural components corresponding to those of the element 371, and so will not be detailed any further. (In FIGURE 2, like reference numerals represent those corresponding elements). The output digital signal from the buffer store 37 is supplied, as was mentioned above, to the second D-to-A converter 43, to which the output analog signal of the first D-to-A converter 42 is applied as the reference voltage.

Now the operation of the embodiment will be described hereunder.

When the detector 311 of the control pulse generator 31 detects the ring-back tone which is generated upon the completion of the two-wire line extending to the called subscriber set, detector 311 generates a trigger pulse upon termination of the ring-back tone and impresses this pulse upon the pulse generator 312 which produces a first control pulse having a pulse width of the order of 150 microseconds (or at least greater than the repetition period, 125 microseconds, of the timing pulses). In response to the first control pulse, the store resetting switch **35*n*4 of the store 35 which is coupled to pulse generator 312, is opened to clear away the stored information, if any. While the store resetting switches 3514–3584 are shown as mechanical switches, it should be understood that electronic switches may be employed which operate at speeds compatible with the repetition rate of the signals employed within the system of FIGURE 2. Upon closing of the resetting switch 35*n*4 in response to the trailing edge of the first control pulse, the store 35 assumes a "stand by" state. Simultaneously with the "clearing" of storage means 35, the first flip-flop circuit 313 is driven in response to the trailing edge of the first control pulse to produce the second control signal at its output 313*a* which, in turn, drives the switch 320 to be closed, while connecting the switches 40 and 41 to the upper 40*a* and lower 41*b*** contacts, respectively.

The second flip-flop circuit 314 which is driven by the first and second control pulses from pulse generator 312 and flip-flop output **313*a* causes the third flip-flop circuit 318 to produce an energizing pulse at its output 318*a* which closes the switch 315. Inasmuch as the second control pulse from timing pulse source 30 is present, at this instant of time, and coupled through switch 315 to one of the inputs of AND gate 316, the output pulses substantially identical to the timing pulses will be produced at the output side of the AND gate 316. However, the output of the AND gate 316 is fed back to the reset input of 318*b* of the third flip-flop circuit 318 to open the switch 315 so as to interrupt the succeeding timing pulses, with the result that only one pulse is produced at the output of the AND gate 316. The single output pulse thus produced by the AND gate 316 is then supplied as the search pulse to the switch 320 after passing through the waveform shaping circuit 317. The search pulse is then coupled to the A-to-D converter 33 through the switch 320, the amplifier 13, the terminating set 14, and the contact 40*a* of switch 40**.

It will be noted here that inasmuch as the waveform of the search pulse at the switch 40 is dependent on the impulse response characteristic of the transmission path including the amplifier 13 and the terminating set 14, the characteristic can be monitored by way of analyzing the output search pulse. In other words, the waveform of the output search pulse which was produced by wave shaping circuit 317 represents the impulse response characteristic of the transmission path after having passed through the transmission path.

At the instant of time that the A-to-D converter 33 produces an 8-digit binary signal group in response to the supplied search pulse, through its contacts **41*b*, the switch 41 connects the output of A-to-D converter 33 to the store 35 in response to the second control pulse generated by pulse source 30 and coupled to A-to-D converter 33. Therefore, the binary signal representative of the impulse response characteristic is coupled to the store 35 by means of the parallel connected leads 50 extending from the A-to-D converter 33 to the store 35. Also, at this time interval, the store loop selection switches 35*n*6 are connected to the upper contacts 3517–3587 as shown in FIGURE 2 so that the delay lines 35*n*2 may be connected in series with the delay lines 35*n*3, in response to the second control pulse from pulse source 30. Inasmuch as the storage means 35 has now reached the above-mentioned "stand by" state, the binary signal is stored in the store elements 351 to 358 in such a manner that each stored binary bit may circulate around the store loop with the period of 126 microseconds. On the other hand, since the bits of each of the succeeding digits of the binary signal arrives at the input side of the storage means 35 (through OR gates 35*n*1) with time interval of 125 microseconds, it will be understood that the succeeding bits are stored with the time spacing of 1 microsecond between every adjacent pulse. To more specifically describe the bits to be stored in the store element 3512, for example, inasmuch as the time point at which the second bit arrives, 125 microseconds behind the first bit, at the input side of the element 3512 is 1 microsecond prior to the time point at which the feedback component of the first bit appears at the input side of the element 3512**, the second bit is stored 1 microsecond in advance of the first bit. The similar operation is repeated until the 125th bit is stored 1 microsecond in advance of the 124th bit.

Referring again to the control pulse generator 31, the pulse counter 319, after being triggered by the output pulse of the AND gate 316, continues to count down the synchronizing pulses, and produces a first output pulse at the time point of the 125th pulse of the timing pulses. Upon reception of the first output pulse from the counter 319, the first flip-flop circuit 313 is reset, i.e., reverses its state, to interrupt the second control pulse. As a result, the switch 320 is opened and the switches 40 and 41 change their connection to contacts **40*b* and 41*a*, respectively, so that the A-to-D converter 33 may serve as the converter for the incoming calling subscriber's signal, and the switches 35*n*6 are reversed to lower contacts 3518–3588 so that the delay lines 35*n*3 may be excluded from the store loop (i.e., bypassed) to change the circulation period of the store elements 351 to 358 from 126 microseconds to 125 microseconds. Inasmuch as the 125th bit supplied to the elements 35*n*2 is in synchronism with the termination of the second control pulse, the 125 bits having thus arrived are thereafter caused to circulate within the respective store elements 351 to 358** with the period of 125 microseconds and 1 microsecond apart from one another. In this manner, the digital signal representative of the impulse response characteristic, which latter has been coded within a time interval of 125 times 125 microseconds, is stored in the time-compressed state.

The digital signal, representative of the calling subscriber's signal supplied to the A-to-D converter 33 for conversion into a binary code, is coupled through the switch contacts **41*a* of switch 41 which has been reversed in response to the trailing edge of the second control pulse, to the buffer store 37. Inasmuch as the delay lines 37*n*2 have delay time of 124 microseconds, and while each of the bits of each incoming digits of the binary signal are 125 microseconds apart from one another, the digits are stored in the elements 371 to 378, as in the store 35 separated in time by 1 microsecond. However, the 125th or later bits is/are synchronized with timing pulses appearing at the input side of the inhibitor 37*n*5, whereby the newly incoming bits are substituted for the older bits in the elements 371 to 378. More specifically, the presence of a timing pulse from timing pulse source 30 at the inhibit input terminal 3716 of inhibitor circuit 3715 inhibits the passage of the binary bit stored at that given instant through inhibitor circuit 3715 and OR gate 3711 to delay line 3712 for recirculation. The bit prevented or inhibited from recirculation is replaced by a new bit generated by the A-to-D converter 33 so that the binary coded information contained in buffer store 37** is continuously updated.

The digital signal, which has been buffer-stored in this manner, is converted again to an analog signal by means of the D-to-A converter 43. Since the output analog signal of the D-to-A converter 42 is supplied as the reference voltage to the converter 43, the decoded output from the converter 43 represents the product of the decoded impulse response characteristic and the buffer-stored digital quantity representative of the calling subscriber's signal, as is well known to those having ordinary skill in the art.

It will be understood from the above explanation as to the storing operation of the stores 35 and 37 that the output analog signal $g(t)$ from integrator circuit 44, which subjects the output from the converter 43 to time-integration is given by the expression $$g(t)=\sum_{i=1}^{125} f(t-\tau_i)k(\tau_i)\Delta\tau$$

where $k(\tau_i)$ ($i=1,2,3 \ldots 125$) stands for the impulse response stored in the delay line **35*n*2 of the store 35, and $f(t-\tau_i)$ for the calling subscriber's signal stored in the delay line 37*n*2 of the buffer-store 37**, and that the above expression is a close approximation of the time integral $$g(t)=\int_0^\infty f(t-\tau)k(\tau)d\tau$$

Therefore, it will be understood that the output from the integrator circuit 44 closely approximates the leakage (echo) component of the calling subscriber's signal passing through the amplifier 13 and the terminating set 14. As a consequence, the leakage component can be cancelled by adding to the output of the output amplifier 17 the composite signal which has been time-integrated by the integrator circuit 44, phase-inverted by the inverter 45, and then amplified by the amplifier 46.

It is to be noted here that the time required for storing 125 bits of the impulse response characteristics in advance of the beginning of the telephone conversation is about 150 microseconds plus 125 times 125 microseconds (about 15,775 microseconds in total) and consequently that the expected performance is realizable.

As will be understood from the foregoing, the composite signal having close approximation to the leakage component can be obtained by processing on a real time basis the impulse response characteristic and the incoming calling subscriber's signal, because the impulse response characteristic in digital form is stored in the time-compressed state and because the incoming calling signal is buffer-stored also in time-compressed state. The binary coded information representing the impulse response characteristic is maintained and recirculated within the storage means 35 during the entire period of the establishment of the communications link between the calling and called subscriber.

For use as the store elements **35*n*2, 35*n*3, and 37*n*2 of the stores 35 and 37**, delay line memory elements each having a ferrite bar and supersonic wave transducers are preferable (substantially the same as those explained in "Electrical Communication," vol. 28, No. 1, pp. 46–53 (March 1951). Although the memory elements of the kind will not be detailed herein because such devices are well known in the art, the loss of the stored digital signal caused in the delay line can be compensated for by inherent gain of the input and output transducers.

Although electro-magnetic switches have been shown in FIGURE 1 for use as the switches 320, 40, 41, **35*n*4, 35*n*6, 37*n*5, any other type of switches may be substituted therefor such as, for example, electronic switches. Also, the amplifier 46 may be dispensed with if the gain of input amplifier 13** is suitably adjusted.

While the invention has been described in connection with the specific embodiment, it is to be clearly understood that this description is made by way of example and not as a limitation to the scope of the invention as set forth in the accompanying claims for patent.

What is claimed is:

1. An echo suppressor for use in a communications network coupling a calling subscriber to a called subscriber comprising a four-wire circuit having an input path for incoming signals from the calling subscriber and an output path for outgoing signals from the called to the calling subscriber; a two-wire circuit coupled to the called subscriber; hybrid means coupled between said two-wire circuit and said four-wire circuit to provide impedance balance between said circuits; the improvement comprising;

first means responsive to an established connection between said input path and said two-wire circuit for impressing an impulse upon the input path prior to the receipt of the calling subscriber signal;

second means coupled to said output path for storing a leakage component passed by said hybrid means to said output path responsive to said impulse applied thereto through said input path;

said second means including third means coupled to said input path for receiving signals representing the calling subscriber's message applied to said input path;

fourth means coupled to said third means and said second means for multiplying the leakage component stored in said second means by said signals;

fifth means for inverting the output of said fourth means, the output of said fifth means being coupled to said output path for eliminating the talker's echo.

2. An echo suppressor for use in a communications network comprising a four-wire circuit having an input and an output path, a two-wire circuit; hybrid means for coupling said two and four-wire circuits to balance the impedance between said circuits the improvement comprising;

first means responsive to an established connection between said input path and said two-wire circuit for impressing an impulse upon the input path of said four-wire circuit;

second means coupled to the four-wire circuit output path for converting the leakage component of said impulse passing through the input path and hybrid means into binary form;

third means for storing the binary output of said second means;

fourth means for decoupling said output path from said second means and for coupling said input path to said second means after said leakage component is stored in said third means;

fifth means coupled to said output of said second means for storing the signal appearing in said input path in binary coded form; sixth means for converting the binary signals stored in said third means into an analog signal;

seventh means for converting the binary signals stored in said fifth means into an analog signal; said seventh means comprising means for multiplying the analog signals generated by said sixth and seventh means to form a resultant product;

eighth means for integrating the resultant product;

ninth means for inverting the output of said eighth means; the output of said ninth means being coupled to said output path to cancel the leakage component in said output path caused by a caller's message applied to the input path thereby eliminating the talker's echo.

3. An echo suppressor for use in a communications network coupling a calling subscriber to a called subscriber comprising a four-wire circuit having an input path for coupling incoming signals from the calling subscriber to a called subscriber and an output path for coupling outgoing signals from the called to the calling subscriber; a two-wire circuit coupled to the called subscriber; hybrid means coupled between said two-wire circuit and said four-wire circuit to provide impedance balance between said circuits; the improvement comprising;

first normally disabled means for generating an impulse signal being coupled to said input circuit;

second means coupled to said input path and responsive to establishment of a communications path between calling and called subscriber to enable said first means;

third means coupled to said output path for storing the impulse responsive signal developed by the transmission path comprised of the input path, the hybrid means and the output path;

fourth means having a first input means coupled to said output path subsequent to completion of said impulse signal and a second input means coupled to said third means for multiplying said impulse response signal by said calling subscriber signal;

fifth means for inverting the output of said fourth means; the output of said fifth means being coupled to said output path for eliminating the talker's echo.

4. An echo suppressor for use in a communications network coupling a calling subscriber to a called subscriber comprising a four-wire circuit having an input path for incoming signals from the calling subscriber and an output path for outgoing signals from the called to the calling subscriber; a two-wire circuit coupled to the called subscriber; hybrid means coupled between said two-wire circuit and said four-wire circuit to provide impedance balance between said circuits; the improvement comprising;

first normally disabled means for generating an impulse signal being coupled to said input circuit;

second means coupled to said input path and responsive to establishment of a communications path between calling and called subscriber to enable said first means;

third means for converting analog signals into a digital output;

fourth switch means having first and second switch positions for selectively coupling said third means to said output path when in a first position and for coupling said third means to said input path when in a second position;

fifth means coupled to said first means for setting said fourth means in said first position responsive to said impulse signal; said fifth means including means for setting said fourth means in said second position responsive to the completion of said impulse signal;

sixth means for storing the output of said third means when said fourth means is in said first position;

seventh means for storing the output of said third means when said fourth means is in said second position;

eighth means for converting the binary signals stored by said sixth means into a first analog signal;

ninth means for converting the binary signals stored by said seventh means into a second analog signal, said ninth means including means for multiplying said first and second analog signals;

tenth means for integrating the output of said ninth means;

eleventh means for inverting the output of said tenth means, the output of said eleventh means being coupled to said output path to eliminate the talker's echo of the calling subscriber's signal.

5. The echo suppressor of claim 4 further comprising:

twelfth switch means controlled by said fifth means for coupling said third means to said sixth means responsive to said impulse signal and for coupling said third means to said seventh means upon completion of said impulse signal.

6. The echo suppressor of claim 4 wherein said sixth and seventh means are circulating memories.

7. The echo suppressor of claim 4 wherein said sixth and seventh means are circulating memories employing delay line elements.

8. The device of claim 6 wherein said sixth means is a closed loop memory comprised of first and second delay line elements.

9. The device of claim 6 wherein said sixth means is a closed loop memory comprised of first and second delay line elements; switch means for bypassing said first delay line element after storage of said impulse response signal is completed.

10. The echo suppressor of claim 9 wherein said sixth means is further comprised of second switch means coupled to said second means for clearing said circulating closed loop memory responsive to recognition of a completed communications path by said second means.

11. The echo suppressor of claim 6 wherein said seventh means is further comprised of a closed loop memory having a delay line element.

12. The echo suppressor of claim 6 wherein said seventh means is further comprised of a closed loop memory having a delay line element;

said closed loop memory having means for updating the contents of memory with the passage of time.

13. The echo suppressor of claim 12 wherein said memory updating means is comprised of first and second gating means each having first and second inputs and an output, said first gating means having its output coupled to said closed loop memory; said second gating means having its output coupled to the first input of said first gating means; the second input of said first gating means being coupled to the output of said third means for entering said digital signals into said closed loop memory; the first input of said second gating means being coupled to said closed loop memory; inhibit means coupled to the second input of said second gating means;

a system clock pulse source coupled to said inhibit means for inhibiting a prior stored binary signal transferral to said second gating means from said closed loop memory before entering the most recently generated binary signals into the closed loop memory.

14. The echo suppressor of claim 10 wherein said sixth means is comprised of a plurality of circulating closed loop memories equal in number to the number of binary signals generated by said third means.

15. The echo suppressor of claim 11 wherein said sixth means is comprised of a plurality of circulating closed loop memories equal in number to the number of binary signals generated by said third means.

References Cited

UNITED STATES PATENTS 2,560,806 7/1951 Lewis ------------ 179—170.2

KATHLEEN H. CLAFFY, Primary Examiner

JAN S. BLACK, Assistant Examiner